(12) United States Patent
Otokuni (10) Patent No.: US 6,756,602 B2
(45) Date of Patent: Jun. 29, 2004

(54) RADIATION IMAGE READ-OUT METHOD AND APPARATUS

(75) Inventor: Shinji Otokuni, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 171 days.

(21) Appl. No.: 10/206,964

(22) Filed: Jul. 30, 2002

(65) Prior Publication Data

US 2003/0020031 A1 Jan. 30, 2003

(30) Foreign Application Priority Data

Jul. 30, 2001 (JP) ........................................ 2001-230101

(51) Int. Cl.[7] ........................... G01T 1/105; G01T 1/115
(52) U.S. Cl. ..................... 250/584; 250/581; 250/582; 250/583; 250/585; 250/586; 250/588
(58) Field of Search ................................ 250/208, 227, 250/484.4, 581, 582, 583, 584, 585, 586, 588, 589

(56) References Cited

U.S. PATENT DOCUMENTS

| | | |
|---|---|---|
| 4,258,264 A | 3/1981 | Kotera et al. |
| 4,346,295 A | 8/1982 | Tanaka et al. |
| 4,485,302 A | 11/1984 | Tanaka et al. |
| 6,423,979 B1 * | 7/2002 | Kohda .......................... 250/589 |
| 6,495,849 B2 * | 12/2002 | Yasuda ......................... 250/584 |
| 6,507,040 B2 * | 1/2003 | Isoda .......................... 250/586 |
| 6,534,779 B1 * | 3/2003 | Kohda et al. ................. 250/589 |
| 2001/0022349 A1 * | 9/2001 | Takahashi ..................... 250/582 |
| 2002/0158216 A1 * | 10/2002 | Neriishi et al. ............. 250/584 |

FOREIGN PATENT DOCUMENTS

| | | |
|---|---|---|
| JP | 55-12429 | 1/1980 |
| JP | 56-11395 | 2/1981 |
| JP | 56-11397 | 2/1981 |

* cited by examiner

Primary Examiner—Nikita Wells
Assistant Examiner—Mary El-Shammaa
(74) Attorney, Agent, or Firm—Sughrue Mion, PLLC (57) ABSTRACT

Stimulating light is projected onto a stimulable phosphor sheet while the image read-out mechanism is being moved in a sub-scanning direction relatively to the stimulable phosphor sheet and stimulated emission emitted from the stimulable phosphor sheet upon exposure to the stimulating light is detected by the photoelectric converter. The image read-out mechanism is moved back and forth in the sub-scanning direction. First and second image signals are obtained on the basis of the stimulated emission detected during the forward and backward movements of the image read-out mechanism, and an image signal representing the radiation image on the stimulable phosphor sheet is obtained on the basis of the first and second image signals.

7 Claims, 2 Drawing Sheets

FIG.1

RADIATION IMAGE READ-OUT METHOD AND APPARATUS

BACKGROUND OF THE INVENTION

1. Field of the Invention

This invention relates to a method of and apparatus for reading out a radiation image, and more particularly to a method of and apparatus for reading out a radiation image where an image read-out means is moved back and forth relatively to a stimulable phosphor sheet.

2. Description of the Related Art

When certain kinds of phosphor are exposed to a radiation such as X-rays, α-rays, β-rays, γ-rays, electron beams, ultraviolet rays and the like, they store a part of energy of the radiation. Then when the phosphor which has been exposed to the radiation is exposed to stimulating light such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a stimulable phosphor sheet (a sheet provided with a layer of the stimulable phosphor) is exposed to a radiation passing through an object such as a human body to have a radiation image of the object stored on the stimulable phosphor sheet as a latent image, stimulating light such as a laser beam is projected onto the stimulable phosphor sheet, and the stimulated emission emitted from the stimulable phosphor sheet is photoelectrically detected, thereby obtaining an image signal (a radiation image signal) representing a radiation image of the object. See, for instance, Japanese Unexamined Patent Publication Nos. 55(1980)-12429, 56(1981)-11395 and 56(1981)-11397.

This system is advantageous over the conventional radiograph system using silver halide photographic film in that a radiation image can be recorded over a much wider range of exposure to a radiation. That is, it has been found that the amount of radiation energy stored in the stimulable phosphor sheet as a latent radiation image and the amount of stimulated emission emitted from the stimulable phosphor sheet upon exposure to the stimulating light are proportional to each other over a very wide range. Accordingly, even if the exposure of the stimulable phosphor sheet to the radiation is greatly increased or reduced under various image taking conditions, an image recorded on the stimulable phosphor sheet can be accurately reproduced by accurately converting the amount of stimulated emission emitted from the stimulable phosphor sheet upon exposure to the stimulating light to an electric image signal.

In apparatuses for reading out an image from the stimulable phosphor sheet (apparatuses for projecting stimulating light and photoelectrically detecting the stimulated emission, the image read-out means comprising a stimulating light projecting means for projecting stimulating light onto a stimulable phosphor sheet on which a radiation image has been recorded and a photoelectric convertor means which photoelectrically converts the stimulated emission emitted from the stimulable phosphor sheet upon exposure to the stimulating light to an electric signal is moved back and forth relatively to the stimulable phosphor sheet and the radiation image is read out generally only during the forward movement of the photoelectric convertor means relatively to the stimulable phosphor sheet.

Further, a radiation image recorded on the stimulable phosphor sheet can be erased by exposing the stimulable phosphor sheet to erasing light and the erased stimulable phosphor sheet can be reused to record and reproducing a radiation image. The residual radiation image still held by a stimulable phosphor sheet after an image is read out from the stimulable phosphor sheet by projecting stimulating light onto the stimulable phosphor sheet is generally erased by projecting a predetermined amount of erasing light onto the stimulable phosphor sheet sufficient to release radiation energy still held by the stimulable phosphor sheet as a latent radiation image to such an extent that the stimulable phosphor sheet becomes reusable irrespective of the magnitude of the residual radiation energy.

However, when the radiation image is read out only during the forward movement of the photoelectric convertor means relatively to the stimulable phosphor sheet, the time required for the photoelectric convertor means to return to the original position from the end of the forward movement thereof becomes a dead time during which no operation useful to obtain a radiation image is performed, which elongates the cycle time for reading out radiation images from the stimulable phosphor sheets and deteriorates the working efficiency of the radiation image read-out apparatus.

Further projecting the erasing light onto the stimulable phosphor sheet in an amount sufficient to release the residual radiation energy can lead to waste of power. That is, the erasing light can be projected onto the stimulable phosphor sheet in an amount more than necessary to release the residual radiation energy when the residual radiation energy is relatively small. Further, projecting the erasing light in an amount more than necessary shortens the service life of the erasing light source.

SUMMARY OF THE INVENTION

In view of the foregoing observations and description, the primary object of the present invention is to provide a method of and apparatus for reading out a radiation image which can improve the working efficiency in reading out a radiation image from a stimulable phosphor sheet.

Another object of the present invention is to provided a method of and apparatus for reading out a radiation image which can improve the energy efficiency in erasing a stimulable phosphor sheet by projecting erasing light onto the stimulable phosphor sheet.

In accordance with the present invention, a stimulable phosphor sheet bearing thereon a radiation image is moved back and forth in first and second directions opposite to each other relatively to an image read-out means in order to two-dimensionally expose the stimulable phosphor sheet to stimulating light, and stimulated emission emitted from the stimulable phosphor sheet upon exposure to the stimulating light is detected during both the forward movement (movement in the first direction) and the backward movement (movement in the direction) of the stimulable phosphor sheet to obtain first and second image signals on the basis of the stimulated emission detected during the respective movements of the stimulable phosphor sheet, and the second image signal is used in various ways, thereby effectively using the backward movement of the stimulable phosphor sheet relatively to the image read-out means.

That is, in accordance with a first aspect of the present invention, there is provided a radiation image read-out method in which stimulating light is projected onto a stimulable phosphor sheet, bearing thereon a radiation image, along a main scanning line by an image read-out means while one of the stimulable phosphor sheet and the image read-out means is being moved in a sub-scanning direction intersecting the main scanning direction relatively to the other and stimulated emission emitted from the stimulable phosphor sheet upon exposure to the stimulating light is detected by the image read-out means and is photoelectrically converted to an electric image signal thereby, wherein the improvement comprises the steps of     moving back and forth one of the stimulable phosphor sheet and the image read-out means in the sub-scanning direction relatively to the other,     detecting stimulated emission emitted from the stimulable phosphor sheet upon exposure to the stimulating light during both the forward movement and the backward movement of said one of the stimulable phosphor sheet and the image read-out means to obtain first and second image signals on the basis of the stimulated emission detected during the respective movements of said one of the stimulable phosphor sheet and the image read-out means, and     obtaining an image signal representing the radiation image on the stimulable phosphor sheet on the basis of the first and second image signals.

In accordance with a second aspect of the present invention, there is provided a radiation image read-out method in which stimulating light is projected onto a stimulable phosphor sheet, bearing thereon a radiation image, along a main scanning line by an image read-out means while one of the stimulable phosphor sheet and the image read-out means is being moved in a sub-scanning direction intersecting the main scanning direction relatively to the other and stimulated emission emitted from the stimulable phosphor sheet upon exposure to the stimulating light is detected by the image read-out means and is photoelectrically converted to an electric image signal thereby, wherein the improvement comprises the steps of     moving the image read-out means back and forth in the sub-scanning direction relatively to the stimulable phosphor sheet,     detecting stimulated emission emitted from a first stimulable phosphor sheet upon exposure to the stimulating light during the forward movement of the image read-out means to obtain a first image signal representing a first radiation image recorded on the first stimulable phosphor sheet on the basis of the stimulated emission detected during the forward movement of the image read-out means relatively to the stimulable phosphor sheet,     detecting stimulated emission emitted from a second stimulable phosphor sheet upon exposure to the stimulating light during the backward movement of the image read-out means to obtain a second image signal representing a second radiation image recorded on the second stimulable phosphor sheet on the basis of the stimulated emission detected during the backward movement of the image read-out means relatively to the stimulable phosphor sheet.

In accordance with a third aspect of the present invention, there is provided a radiation image read-out method in which stimulating light is projected onto a stimulable phosphor sheet, bearing thereon a radiation image, along a main scanning line by an image read-out means while one of the stimulable phosphor sheet and the image read-out means is being moved in a sub-scanning direction intersecting the main scanning direction relatively to the other and stimulated emission emitted from the stimulable phosphor sheet upon exposure to the stimulating light is detected by the image read-out means and is photoelectrically converted to an electric image signal thereby, wherein the improvement comprises the steps of     moving back and forth one of the stimulable phosphor sheet and the image read-out means in the sub-scanning direction relatively to the other,     detecting stimulated emission emitted from the stimulable phosphor sheet upon exposure to the stimulating light during the forward movement of said one of the stimulable phosphor sheet and the image read-out means to obtain a first image signal representing the radiation image on the basis of the stimulated emission detected during the forward movement of said one of the stimulable phosphor sheet and the image read-out means,     detecting stimulated emission emitted from the stimulable phosphor sheet upon exposure to the stimulating light during the backward movement of said one of the stimulable phosphor sheet and the image read-out means to obtain a second image signal representing the residual radiation image on the basis of the stimulated emission detected during the backward movement of said one of the stimulable phosphor sheet and the image read-out means, and     obtaining information useful to determine the level of erasing light on the basis of the second image signal.

The image read-out means comprises a stimulating light projecting means which projects stimulating light onto a stimulable phosphor sheet along a main scanning line and an image signal generating means which generates an image signal representing a radiation image on the stimulable phosphor sheet by photoelectric conversion of stimulated emission emitted from the stimulable phosphor sheet upon exposure to the stimulating light.

In accordance with a fourth aspect of the present invention, there is provided a radiation image read-out apparatus comprising an image read-out means provided with a stimulating light projecting means which projects stimulating light onto a stimulable phosphor sheet, bearing thereon a radiation image, along a main scanning line, and a photoelectric convertor means which detects stimulated emission emitted from the stimulable phosphor sheet upon exposure to the stimulating light, and a sub-scanning means which moves one of the stimulable phosphor sheet and the image read-out means in a sub-scanning direction intersecting the main scanning direction relatively to the other, the image read-out means causing the photoelectric convertor means to detect stimulated emission emitted from the stimulable phosphor sheet upon exposure to the stimulating light while one of the stimulable phosphor sheet and the image read-out means is moved in the sub-scanning direction relatively to the other and to photoelectrically convert the stimulated emission to an electric signal, thereby obtaining an electric image signal representing the radiation image on the stimulable phosphor sheet, wherein the improvement comprises that     the sub-scanning means moves back and forth one of the stimulable phosphor sheet and the image read-out means in the sub-scanning direction relatively to the other, and     the image read-out means detects stimulated emission emitted from the stimulable phosphor sheet upon exposure to the stimulating light during both the forward movement and the backward movement of said one of the stimulable phosphor sheet and the image read-out means to obtain first and second image signals on the basis of the stimulated emission detected during the respective movements of said one of the stimulable phosphor sheet and the image read-out means, and obtains an image signal representing the radiation image on the stimulable phosphor sheet on the basis of the first and second image signals.

The photoelectric convertor means may comprise a CCD.

In accordance with a fifth aspect of the present invention, there is provided a radiation image read-out apparatus comprising an image read-out means provided with a stimulating light projecting means which projects stimulating light onto a stimulable phosphor sheet, bearing thereon a radiation image, along a main scanning line, and a photoelectric convertor means which detects stimulated emission emitted from the stimulable phosphor sheet upon exposure to the stimulating light, and a sub-scanning means which moves the image read-out means in a sub-scanning direction intersecting the main scanning direction relatively to the stimulable phosphor sheet, the image read-out means causing the photoelectric convertor means to detect stimulated emission emitted from the stimulable phosphor sheet upon exposure to the stimulating light while the stimulable phosphor sheet is moved in the sub-scanning direction relatively to the stimulable phosphor sheet and to photoelectrically convert the stimulated emission to an electric signal, thereby obtaining an electric image signal representing the radiation image on the stimulable phosphor sheet, wherein the improvement comprises that the sub-scanning means moves the image read-out means back and forth in the sub-scanning direction relatively to the stimulable phosphor sheet, and the image read-out means detects stimulated emission emitted from a first stimulable phosphor sheet upon exposure to the stimulating light during the forward movement of the image read-out means to obtain a first image signal representing a first radiation image recorded on the stimulable phosphor sheet on the basis of the stimulated emission detected during the forward movement of the image read-out means relatively to the stimulable phosphor sheet, and detects stimulated emission emitted from a second stimulable phosphor sheet upon exposure to the stimulating light during the backward movement of the image read-out means to obtain a second image signal representing a second radiation image recorded on the second stimulable phosphor sheet on the basis of the stimulated emission detected during the backward movement of the image read-out means relatively to the stimulable phosphor sheet.

In accordance with a sixth aspect of the present invention, there is provided a radiation image read-out apparatus comprising an image read-out means provided with a stimulating light projecting means which projects stimulating light onto a stimulable phosphor sheet, bearing thereon a radiation image, along a main scanning line, and a photoelectric convertor means which detects stimulated emission emitted from the stimulable phosphor sheet upon exposure to the stimulating light, and a sub-scanning means which moves one of the stimulable phosphor sheet and the image read-out means in a sub-scanning direction intersecting the main scanning direction relatively to the other, the image read-out means causing the photoelectric convertor means to detect stimulated emission emitted from the stimulable phosphor sheet upon exposure to the stimulating light while one of the stimulable phosphor sheet and the image read-out means is moved in the sub-scanning direction relatively to the other and to photoelectrically convert the stimulated emission to an electric signal, thereby obtaining an electric image signal representing the radiation image on the stimulable phosphor sheet, wherein the improvement comprises that the sub-scanning means moves back and forth one of the stimulable phosphor sheet and the image read-out means in the sub-scanning direction relatively to the other, and the image read-out means detects stimulated emission emitted from the stimulable phosphor sheet upon exposure to the stimulating light during the forward movement of said one of the stimulable phosphor sheet and the image read-out means to obtain a first image signal representing the radiation image on the basis of the stimulated emission detected during the forward movement of said one of the stimulable phosphor sheet and the image read-out means, and detects stimulated emission emitted from the stimulable phosphor sheet upon exposure to the stimulating light during the backward movement of said one of the stimulable phosphor sheet and the image read-out means to obtain a second image signal representing the residual radiation image on the basis of the stimulated emission detected during the backward movement of said one of the stimulable phosphor sheet and the image read-out means, thereby obtaining information useful to determine the level of erasing light on the basis of the second image signal.

The expression "move one of the stimulable phosphor sheet and the image read-out means relatively to the other" means that the stimulable phosphor sheet is moved relatively to the image read-out means, that the image read-out means is moved relatively to the stimulable phosphor sheet, or that both the stimulable phosphor sheet and the image read-out means are moved relatively to the other. At this time, when the image read-out means is moved, only the part thereof necessary to obtain the image signal may be moved.

The "information useful to determine the level of erasing light" may be, for instance, information representing the amount of erasing light necessary to erase the residual radiation image.

In the method in accordance with the second aspect of the present invention and the apparatus in accordance with the fifth aspect of the present invention, the first and second stimulable phosphor sheets may be either the same or different from each other. That is, the first and second radiation images may be recorded on a stimulable phosphor sheet so that the second radiation is recorded on the stimulable phosphor sheet after the first radiation image is read out during the forward movement of the image read-out means and is read out during the backward movement of the image read-out means, or may be recorded on respective stimulable phosphor sheets so that, for instance, the first stimulable phosphor sheet is replaced with the second stimulable phosphor sheet after the forward movement of the image read-out means and the image read-out means reads out the first radiation image from the first stimulable phosphor sheet during the forward movement of the image read-out means and reads out the second radiation image from the second stimulable phosphor sheet during the backward movement of the image read-out means.

In the method in accordance with the first aspect of the present invention and the apparatus in accordance with the fourth aspect of the present invention, the image signal representing a radiation image recorded on the stimulable phosphor sheet is read out during both the forward movement and the backward movement of the stimulable phosphor sheet and/or the image read-out means, and accordingly, the backward movement can be well utilized, whereby the overall working efficiency can be improved.

When the photoelectric convertor means comprises a CCD, which is narrower in allowable input range than a photomultiplier (about 1/10), and the amount of stimulated emission emitted from particular areas of the stimulable phosphor sheet in the forward movement overflows the allowable input range of the CCD, the amount of stimulated emission emitted from the stimulable phosphor sheet in the backward movement cannot overflow the allowable input range of the CCD or overflows at less areas than in the forward movement since radiation energy stored in the stimulable phosphor sheet has been once released in the forward movement, and accordingly, the image signal components for the particular areas where the stimulated emission overflows the allowable input range of the CCD can be filled with the image signal components obtained in the backward movement. Thus, a more precise image signal can be obtained when an image signal representing a radiation image is generated on the basis of both the image signals respectively obtained during the forward movement and the backward movement.

In the method in accordance with the second aspect of the present invention and the apparatus in accordance with the fifth aspect of the present invention, two radiation images can be read out during one reciprocation of the image read-out means, and accordingly, the working efficiency can be improved as compared with the conventional method and apparatus where a radiation image is read out during only the forward movement.

In the method in accordance with the third aspect of the present invention and the apparatus in accordance with the sixth aspect of the present invention, by determining the amount of erasing light to be projected onto the stimulable phosphor sheet on the basis of the information obtained during the backward movement, the erasing light can be prevented from being projected onto the stimulable phosphor sheet in an amount more than necessary to release the residual radiation energy and the erasing light source can be prevented from being shortened in its service life.

DESCRIPTION OF THE PREFERRED EMBODIMENT

Figure 1:
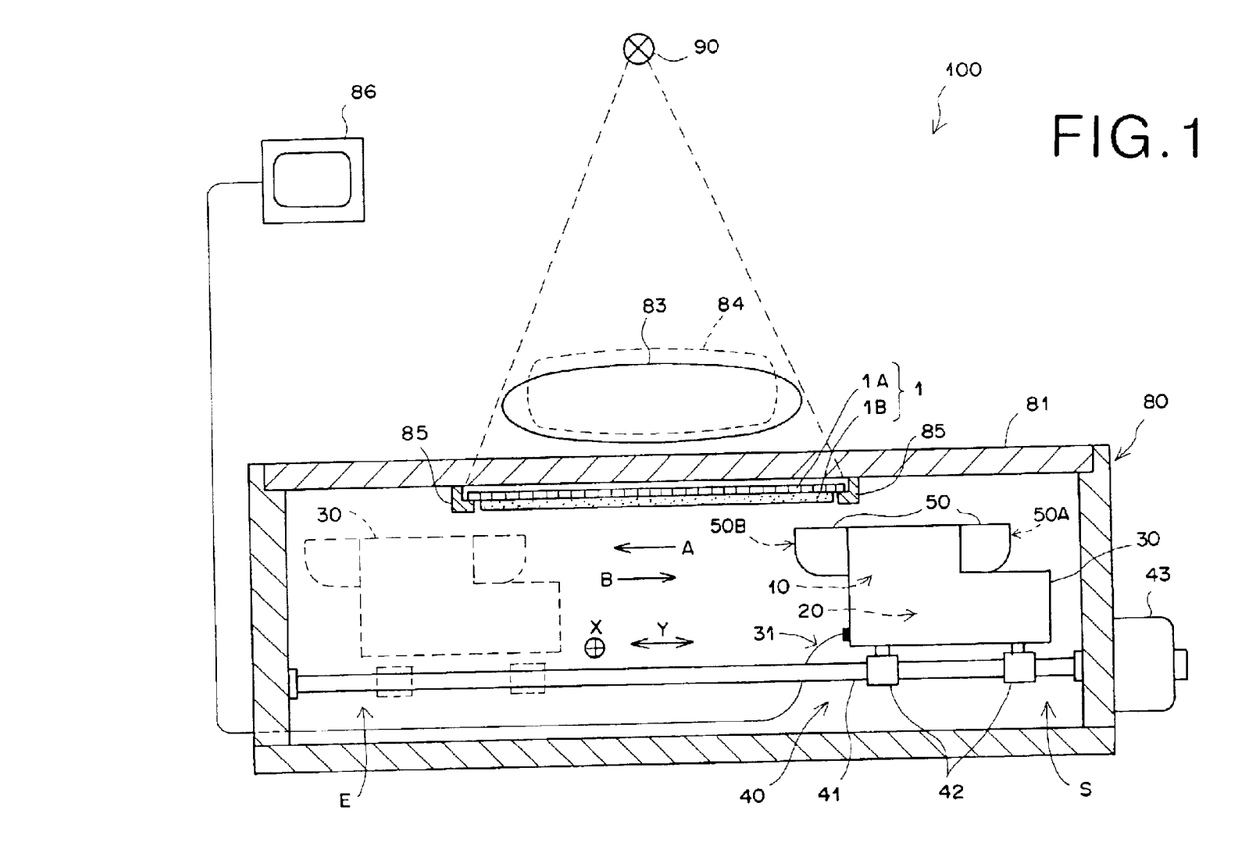
FIG. 1 is a schematic view showing a radiation image recording and read-out apparatus to which the present invention is applied.

In FIG. 1, a radiation image recording and read-out apparatus 100 comprise a radiation image read-out apparatus 80 and a radiation source 90 which is provided above the radiation image read-out apparatus 80 and emits a radiation such as X-rays. A radiation-transmissible object support plate 81 is provided on the top of the radiation image read-out apparatus 80, and a sheet holder 85 which holds a stimulable phosphor sheet 1 is provided on the lower side of the object support plate 81. The stimulable phosphor sheet 1 is put in and out the sheet holder 85 in the direction of arrow X. The stimulable phosphor sheet 1 comprises a support plate 1A transparent to the radiation and a stimulable phosphor layer 1B formed on the support plate 1A, and the sheet holder 85 holds the opposite sides of the support plate 1A of the stimulable phosphor sheet 1.

When the radiation is emitted from the radiation source 90 with an object 83 supported on the object support plate 81, a radiation image of the object 83 is recorded on the stimulable phosphor sheet 1 held by the sheet holder 85.

The radiation image read-out apparatus 80 comprises an image read-out means 30 comprising a stimulating light projecting means 10 which projects stimulating light onto the stimulable phosphor sheet 1 held by the sheet holder 85 along a main scanning line extending in a main scanning direction (the direction of arrow X) from below and an image signal obtaining means 20 which photoelectrically converts stimulated emission emitted from the stimulable phosphor sheet 1 upon exposure to the stimulating light to an image signal representing the radiation image recorded on the stimulable phosphor sheet 1, a sub-scanning means 40 which moves back and forth the image read-out means 30 relatively to the stimulable phosphor sheet 1 in a sub-scanning direction (the direction of arrow Y) intersecting the main scanning direction, and an erasing means 50 which is integrated with the image read-out means 30 and erases residual radiation image on the stimulable phosphor sheet 1.

The image read-out means 30 is moved between a right-most position (a first position S) shown by the solid line in FIG. 1 and a leftmost position (a second position E) shown by the broken line in FIG. 1 by the sub-scanning means 40. In this particular example, movement of the image read-out means 30 from the first position S (home position) to the second position E in the direction of arrow A will be referred to as "the forward movement" and movement of the image read-out means 30 from the second position E to the first position S in the direction of arrow B will be referred to as "the backward movement".

Figure 2:
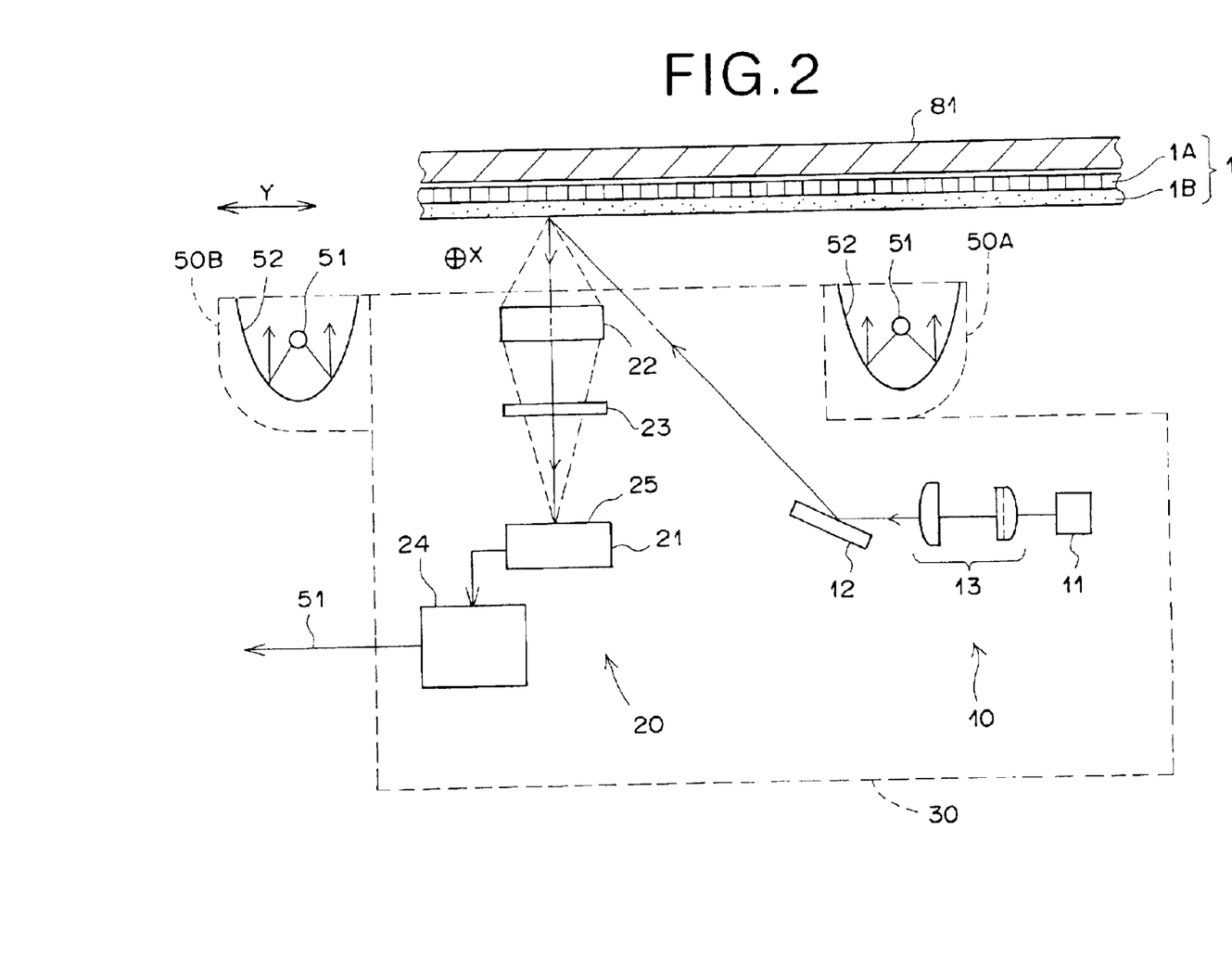
FIG. 2 is a schematic cross-sectional view showing the image read-out means integrated with the erasing means in the radiation image recording and read-out apparatus.

The stimulating light projecting means 10 comprises, as shown in FIG. 2, a broad area laser 11 which emits line-like stimulating light and a convergent optical system 13 consisting of a toric lens which converges the line-like stimulating light emitted from the broad area laser 11 onto the line-like area on the stimulable phosphor sheet 1 by way of a reflecting mirror 12.

The image signal obtaining means 20 comprises a photoelectric convertor means 21, an imaging lens 22, a stimulating light cut filter 23 and an operator 24. The imaging lens 22 comprises a plurality of lenses arranged in the main scanning direction (e.g. a refractive index distribution type lens array or a micro lens array) and forms an erected image of the line-like area on the stimulable phosphor sheet 1 exposed to the line-like stimulating light in a natural size on a light receiving face 25 of the photoelectric convertor means 21. The photoelectric convertor means 21 comprises a plurality of CCDs arranged in the main scanning direction and receives stimulated emission emitted from the line-like area on the stimulable phosphor sheet 1 an image of which is formed thereon by the imaging lens 22. Then the photoelectric convertor means 21 photoelectrically converts the stimulated emission to an electric image signal. The stimulating light cut filter 23 is positioned between the imaging lens 22 and the photoelectric convertor means 21 and prevents the stimulating light from impinging upon the photoelectric convertor means 21. The operator 24 stores the image signal output from the photoelectric convertor means 21 and carries out operations on the image signal.

The erasing means 50 comprises first and second erasing means 50A and 50B fixed on opposite sides of the image read-out means 30. Each of the first and second erasing means 50A and 50B comprises an erasing light source 51 such as a fluorescent lamp extending in the main scanning direction, and a reflecting plate 52 which extends in the main scanning direction and reflects erasing light emitted from the erasing light source 51 toward the stimulable phosphor sheet 1.

The sub-scanning means 40 comprises a ball screw 41 extending in the sub-scanning direction, ball-screw-bearings 42 which are in mesh with the ball screw 41 and are connected to the image read-out means 30, and an electric motor 43 which rotates the ball screw 41 in the regular direction and the reverse direction.

First Embodiment

In a first embodiment, the radiation image read-out apparatus 80 operates so that the sub-scanning means 40 moves the image read-out means 30 back and forth in the sub-scanning direction relatively to a stimulable phosphor sheet 1, the stimulating light projecting means 10 projects the stimulating light onto the stimulable phosphor sheet 1 during both the forward movement and the backward movement of the image read-out means 30, the image signal obtaining means obtains first and second image signals on the basis of stimulated emission emitted from the stimulable phosphor sheet 1 during the forward movement and stimulated emission emitted from the stimulable phosphor sheet 1 during the backward movement and the radiation image read-out apparatus 80 obtains an image signal representing the radiation image recorded on the stimulable phosphor sheet 1 on the basis of the first and second image signals.

In the first embodiment, the operator 24 adds up the first and second image signals.

With the object 83 is placed on the object support table 81, the radiation source 90 is operated. The radiation emitted from the radiation source 90 impinges upon the stimulable phosphor sheet 1 passing through the object 83 supported on the object support table 81, whereby a radiation image of the object 83 is recorded on the stimulable phosphor layer 1B of the stimulable phosphor sheet 1. Thereafter, the image read-out means 30 is started to be moved in the direction of arrow A relatively to the stimulable phosphor sheet 1 (the forward movement).

In the forward movement of the image read-out means 30, the image read-out means 30 is conveyed at a constant speed in the direction of arrow A by the sub-scanning means 40 and a radiation image on the stimulable phosphor sheet 1 is read out. That is, as the image read-out means 30 is moved in the direction of arrow A, the area of the stimulable phosphor sheet 1 exposed to the stimulating light is also moved in the direction of arrow A, whereby the stimulable phosphor sheet 1 is two-dimensionally exposed to the stimulating light. Stimulated emission is emitted from the area of the stimulable phosphor sheet 1 exposed to the stimulating light in an amount proportional to radiation energy stored therein. The stimulated emission is photoelectrically converted to an electric signal by the photoelectric convertor means 21, whereby a first image signal representing the radiation image read out during the forward movement is obtained. The first image signal is stored in the operator 24. After the first image signal is obtained during the forward movement, the image read-out means 30 is in the second position E shown in the broken line in FIG. 1.

Thereafter the sub-scanning means 40 moves the image read-out means 30 backward to the first position S. In the backward movement of the image read-out means 30, the image read-out means 30 is conveyed at a constant speed in the direction of arrow B by the sub-scanning means 40 and a radiation image on the stimulable phosphor sheet 1 is read out in the same manner as in the forward movement of the image read-out means 30, whereby a second image signal is obtained and is stored in the operator 24.

The first and second image signals stored in the operator 24 are added and output from the operator 24 as a synthesized image signal. The image signal is sent to a display 86 by way of a cable 31 and an image is displayed on the display 86 on the basis of the image signal.

Since radiation energy forming a latent radiation image recorded on the stimulable phosphor sheet 1 has been partly released by the stimulating light projected onto the stimulable phosphor sheet 1 during the forward movement of the image read-out means 30, the amount of stimulated emission emitted from the stimulable phosphor sheet 1 during the backward movement of the image read-out means 30 is small as compared with that emitted from the stimulable phosphor sheet 1 during the forward movement of the image read-out means 30. For example, if the amount of stimulated emission emitted from particular areas of the stimulable phosphor sheet in the forward movement overflows the allowable input range of the photoelectric convertor means 21, the image signal components for the particular areas where the stimulated emission overflows the allowable input range of the photoelectric convertor means 21 can be filled with the image signal components obtained in the backward movement of the image read-out means 30, whereby a more precise image signal can be obtained. Further, when the amount of stimulated emission emitted from the stimulable phosphor sheet 1 during the forward movement is too small to precisely generate an image signal component, such an image signal can be filled with the image signal component obtained in the backward movement, whereby a more precise image signal can be obtained.

Though, in the first embodiment, the radiation image is read out twice, once each of the forward and backward movements of the image read-out means 30, the radiation image may be read out three times or more by further reciprocating the image read-out means 30 and an image signal representing a radiation image may be obtained on the basis of all the image signals obtained in the respective forward or backward movements of the image read out means 30.

Second Embodiment

In a second embodiment, the radiation image read-out apparatus 80 operates so that the sub-scanning means 40 moves the image read-out means 30 back and forth in the sub-scanning direction relatively to a stimulable phosphor sheet 1, stimulated emission emitted from a first stimulable phosphor sheet upon exposure to the stimulating light during the forward movement of the image read-out means 30 is detected and photoelectrically converted to a first image signal representing a first radiation image recorded on the first stimulable phosphor sheet, and stimulated emission emitted from a second stimulable phosphor sheet upon exposure to the stimulating light during the backward movement of the image read-out means 30 is detected and photoelectrically converted to a second image signal representing a second radiation image recorded on the second stimulable phosphor sheet.

In the second embodiment, the operator 24 functions as a buffer which temporarily storing an image signal.

A first object 83 is placed on the object support table 81 and the radiation source 90 is operated. The radiation emitted from the radiation source 90 impinges upon the stimulable phosphor sheet 1 passing through the first object 83 supported on the object support table 81, whereby a radiation image of the first object 83 is recorded on the stimulable phosphor layer 1B of the stimulable phosphor sheet 1. Thereafter, the image read-out means 30 is started to be moved in the direction of arrow A relatively to the stimulable phosphor sheet 1 (the forward movement).

In the forward movement of the image read-out means 30, the image read-out means 30 is conveyed at a constant speed in the direction of arrow A by the sub-scanning means 40 and a radiation image on the stimulable phosphor sheet 1 is read out in the same manner as in the first embodiment, whereby a first image signal representing the radiation image read out during the forward movement is obtained. The first image signal is stored in the operator 24. After the first image signal is obtained during the forward movement, the image read-out means 30 is in the second position E shown in the broken line in FIG. 1.

The first image signal is output from the operator 24 and is sent to the display 86 by way of the cable 31 and an image is displayed on the display 86 on the basis of the first image signal.

As the image read-out means 30 is moved forward and a radiation image is read-out from the stimulable phosphor sheet 1, the first erasing means 50A projects erasing light onto the area of the stimulable phosphor sheet 1 the radiation image on which has been read out, thereby erasing the residual radiation image on the area so that when the image read-out means 30 reaches the second position E, the stimulable phosphor sheet 1 is in such a state that another radiation image can be recorded. That is, by the time the image read-out means 30 reaches the second position E, a first image signal representing a radiation image of the first object 83 has been read out from the stimulable phosphor sheet 1 and erasing of the stimulable phosphor sheet 1 has been completed.

Then a second object 84 is placed on the object support table 81 in place of the first object 83 and the radiation source 90 is operated. The radiation emitted from the radiation source 90 impinges upon the stimulable phosphor sheet 1 passing through the second object 84 supported on the object support table 81, whereby a radiation image of the second object 84 is recorded on the stimulable phosphor layer 1B of the stimulable phosphor sheet 1 which has been erased.

Thereafter the sub-scanning means 40 moves the image read-out means 30 backward to the first position S. In the backward movement of the image read-out means 30, the image read-out means 30 is conveyed at a constant speed in the direction of arrow B by the sub-scanning means 40 and a radiation image on the stimulable phosphor sheet 1 is read out in the same manner as in the forward movement of the image read-out means 30, whereby a second image signal representing a radiation image of the second object 84 is obtained and is stored in the operator 24.

The second image signal is output from the operator 24 and is sent to the display 86 by way of the cable 31 and an image is displayed on the display 86 on the basis of the second image signal.

As the image read-out means 30 is moved backward and a radiation image of the second object 84 is read-out from the stimulable phosphor sheet 1, the second erasing means 50B projects erasing light onto the area of the stimulable phosphor sheet 1 the radiation image on which has been read out, thereby erasing the residual radiation image on the area so that when the image read-out means 30 returns to the first position S, the stimulable phosphor sheet 1 is in such a state that another radiation image can be recorded.

Though, in the second embodiment, different radiation images are read out from one stimulable phosphor sheet 1 in the forward and backward movements of the image read-out means 30, different radiation images may be read out from different stimulable phosphor sheets 1 in the forward and backward movements of the image read-out means 30. For example, after a radiation image is read out from a first stimulable phosphor sheet in the forward movement of the image read-out means 30, a second stimulable phosphor sheet bearing thereon another radiation image may be placed in the sheet holder 85 in place of the first stimulable phosphor sheet, and the radiation image recorded on the second stimulable phosphor sheet may be read out in the backward movement of the image read-out means 30.

By reading out a radiation image in each of the forward and backward movements as in the first and second embodiments, the working efficiency can be improved.

Third Embodiment

In a third embodiment, the radiation image read-out apparatus 80 operates so that the sub-scanning means 40 moves the image read-out means 30 back and forth in the sub-scanning direction relatively to a stimulable phosphor sheet 1, stimulated emission emitted from the stimulable phosphor sheet 1 upon exposure to the stimulating light during the forward movement of the image read-out means 30 is detected and photoelectrically converted to a first image signal representing a radiation image read out in the forward movement of the image read-out means 30, stimulated emission emitted from the stimulable phosphor sheet upon exposure to the stimulating light during the backward movement of the image read-out means 30 is detected and photoelectrically converted to a second image signal representing the residual radiation image, and information useful to determine the level of erasing light is obtained on the basis of the second image signal.

In the third embodiment, the operator 24 functions as a buffer which temporarily storing an image signal during the forward movement of the image read-out means 30 and as an erasing light level calculating means for calculating the level of the erasing light necessary to erase the residual radiation image on the stimulable phosphor sheet.

With the object 83 is placed on the object support table 81, the radiation source 90 is operated. The radiation emitted from the radiation source 90 impinges upon the stimulable phosphor sheet 1 passing through the object 83 supported on the object support table 81, whereby a radiation image of the object 83 is recorded on the stimulable phosphor layer 1B of the stimulable phosphor sheet 1. Thereafter, the image read-out means 30 is started to be moved in the direction of arrow A relatively to the stimulable phosphor sheet 1 (the forward movement).

In the forward movement of the image read-out means 30, the image read-out means 30 is conveyed at a constant speed in the direction of arrow A by the sub-scanning means 40 and a radiation image on the stimulable phosphor sheet 1 is read out in the same manner as described above, whereby a first image signal representing the radiation image read out during the forward movement is obtained. The first image signal is stored in the operator 24. The first image signal is output from the operator 24 and is sent to the display 86 by way of the cable 31 and an image is displayed on the display 86 on the basis of the first image signal. After the first image signal is obtained during the forward movement, the image read-out means 30 is in the second position E shown in the broken line in FIG. 1.

Thereafter the sub-scanning means 40 moves the image read-out means 30 backward to the first position S. In the backward movement of the image read-out means 30, the image read-out means 30 is conveyed at a constant speed in the direction of arrow B by the sub-scanning means 40 and a radiation image on the stimulable phosphor sheet 1 is read out in the same manner as in the forward movement of the image read-out means 30, whereby a second image signal is obtained and is stored in the operator 24. That is, a second image signal representing a residual radiation image remaining on the stimulable phosphor sheet 1 after the radiation image is read out from the stimulable phosphor sheet in the forward movement is stored in the operator 24.

As the image read-out means 30 is moved backward and the residual radiation image on the stimulable phosphor sheet 1 is read-out, the second erasing means 50B projects erasing light onto the area of the stimulable phosphor sheet 1 the residual radiation image on which has been read out, thereby erasing the residual radiation image on the area so that when the image read-out means 30 returns to the first position S, the stimulable phosphor sheet 1 is in such a state that another radiation image can be recorded. The amount of the erasing light emitted from the second erasing means 50B is determined on the basis of the second image signal.

That is, proper amounts of erasing light are successively calculated on the basis of the second image signal so that as the residual radiation energy remaining on the stimulable phosphor sheet 1 represented by the second image signal increases, the erasing light is projected onto the stimulable phosphor sheet 1 in an larger amount, and the proper amounts of erasing light are output to an erasing light source driver (not shown) from the operator 24.

When the amount of erasing light to be projected onto the stimulable phosphor sheet is determined on the basis of the second image signal obtained during the backward movement, the erasing light can be prevented from being projected onto the stimulable phosphor sheet 1 in an amount more than necessary to release the residual radiation energy, whereby the erasing light can be efficiently projected onto the stimulable phosphor sheet 1 without waste consumption of power and without shortening the service life of the erasing light source. The amount of erasing light to be projected onto each stimulable phosphor sheet 1 may be fixed to a maximum value of the proper amounts of erasing light.

The stimulating light projecting means 10, in place of using a broad area laser, may comprise a normal laser and a rotary polygonal mirror so that a beam spot is caused to scan the stimulable phosphor sheet 1 in the main scanning direction.

Further, in the case where it is not necessary to change the stimulable phosphor sheet 1, a stimulable phosphor layer may be formed directly on the lower side of the object support table 81 in place of disposing a stimulable phosphor sheet 1 on the lower side of the same.

The photoelectric convertor means 21 may comprise a CMOS image sensor without limited to a CCD. Further, when the stimulating light projecting means 10 comprises a normal laser and a rotary polygonal mirror so that a beam spot is caused to scan the stimulable phosphor sheet 1 in the main scanning direction, a photomultiplier may be used as the photoelectric convertor means 21.

Though, in the embodiments described above, the image read-out means 30 is driven back and forth with respect to the stimulable phosphor sheet 1, the stimulable phosphor sheet 1 may be driven back and forth with respect to the image read-out means 30.

What is claimed is:

1. A radiation image read-out method in which stimulating light is projected onto a stimulable phosphor sheet, bearing thereon a radiation image, along a main scanning line by an image read-out means while one of the stimulable phosphor sheet and the image read-out means is being moved in a sub-scanning direction intersecting the main scanning direction relatively to the other and stimulated emission emitted from the stimulable phosphor sheet upon exposure to the stimulating light is detected by the image read-out means and is photoelectrically converted to an electric image signal thereby, wherein the improvement comprises the steps of moving back and forth one of the stimulable phosphor sheet and the image read-out means in the sub-scanning direction relatively to the other, detecting stimulated emission emitted from the stimulable phosphor sheet upon exposure to the stimulating light during both the forward movement and the backward movement of said one of the stimulable phosphor sheet and the image read-out means to obtain first and second image signals on the basis of the stimulated emission detected during the respective movements of said one of the stimulable phosphor sheet and the image read-out means, and obtaining an image signal representing the radiation image on the stimulable phosphor sheet on the basis of the first and second image signals.

2. A radiation image read-out method in which stimulating light is projected onto a stimulable phosphor sheet, bearing thereon a radiation image, along a main scanning line by an image read-out means while one of the stimulable phosphor sheet and the image read-out means is being moved in a sub-scanning direction intersecting the main scanning direction relatively to the other and stimulated emission emitted from the stimulable phosphor sheet upon exposure to the stimulating light is detected by the image read-out means and is photoelectrically converted to an electric image signal thereby, wherein the improvement comprises the steps of moving the image read-out means back and forth in the sub-scanning direction relatively to the stimulable phosphor sheet, detecting stimulated emission emitted from a first stimulable phosphor sheet upon exposure to the stimulating light during the forward movement of the image read-out means to obtain a first image signal representing a first radiation image recorded on the first stimulable phosphor sheet on the basis of the stimulated emission detected during the forward movement of the image read-out means relatively to the stimulable phosphor sheet, detecting stimulated emission emitted from a second stimulable phosphor sheet upon exposure to the stimulating light during the backward movement of the image read-out means to obtain a second image signal representing a second radiation image recorded on the second stimulable phosphor sheet on the basis of the stimulated emission detected during the backward movement of the image read-out means relatively to the stimulable phosphor sheet.

3. A radiation image read-out method in which stimulating light is projected onto a stimulable phosphor sheet, bearing thereon a radiation image, along a main scanning line by an image read-out means while one of the stimulable phosphor sheet and the image read-out means is being moved in a sub-scanning direction intersecting the main scanning direction relatively to the other and stimulated emission emitted from the stimulable phosphor sheet upon exposure to the stimulating light is detected by the image read-out means and is photoelectrically converted to an electric image signal thereby, wherein the improvement comprises the steps of moving back and forth one of the stimulable phosphor sheet and the image read-out means in the sub-scanning direction relatively to the other, detecting stimulated emission emitted from the stimulable phosphor sheet upon exposure to the stimulating light during the forward movement of said one of the stimulable phosphor sheet and the image read-out means to obtain a first image signal representing the radiation image on the basis of the stimulated emission detected during the forward movement of said one of the stimulable phosphor sheet and the image read-out means, detecting stimulated emission emitted from the stimulable phosphor sheet upon exposure to the stimulating light during the backward movement of said one of the stimulable phosphor sheet and the image read-out means to obtain a second image signal representing the residual radiation image on the basis of the stimulated emission detected during the backward movement of said one of the stimulable phosphor sheet and the image read-out means, and obtaining information useful to determine the level of erasing light on the basis of the second image signal.

4. A radiation image read-out apparatus comprising an image read-out means provided with a stimulating light projecting means which projects stimulating light onto a stimulable phosphor sheet, bearing thereon a radiation image, along a main scanning line, and a photoelectric convertor means which detects stimulated emission emitted from the stimulable phosphor sheet upon exposure to the stimulating light, and a sub-scanning means which moves one of the stimulable phosphor sheet and the image read-out means in a sub-scanning direction intersecting the main scanning direction relatively to the other, the image read-out means causing the photoelectric convertor means to detect stimulated emission emitted from the stimulable phosphor sheet upon exposure to the stimulating light while one of the stimulable phosphor sheet and the image read-out means is moved in the sub-scanning direction relatively to the other and to photoelectrically convert the stimulated emission to an electric signal, thereby obtaining an electric image signal representing the radiation image on the stimulable phosphor sheet, wherein the improvement comprises that the sub-scanning means moves back and forth one of the stimulable phosphor sheet and the image read-out means in the sub-scanning direction relatively to the other, and the image read-out means detects stimulated emission emitted from the stimulable phosphor sheet upon exposure to the stimulating light during both the forward movement and the backward movement of said one of the stimulable phosphor sheet and the image read-out means to obtain first and second image signals on the basis of the stimulated emission detected during the respective movements of said one of the stimulable phosphor sheet and the image read-out means, and obtains an image signal representing the radiation image on the stimulable phosphor sheet on the basis of the first and second image signals.

5. A radiation image read-out apparatus as defined in claim 4 in which the photoelectric convertor means comprises a CCD.

6. A radiation image read-out apparatus comprising an image read-out means provided with a stimulating light projecting means which projects stimulating light onto a stimulable phosphor sheet, bearing thereon a radiation image, along a main scanning line, and a photoelectric convertor means which detects stimulated emission emitted from the stimulable phosphor sheet upon exposure to the stimulating light, and a sub-scanning means which moves the image read-out means in a sub-scanning direction intersecting the main scanning direction relatively to the stimulable phosphor sheet, the image read-out means causing the photoelectric convertor means to detect stimulated emission emitted from the stimulable phosphor sheet upon exposure to the stimulating light while the stimulable phosphor sheet is moved in the sub-scanning direction relatively to the stimulable phosphor sheet and to photoelectrically convert the stimulated emission to an electric signal, thereby obtaining an electric image signal representing the radiation image on the stimulable phosphor sheet, wherein the improvement comprises that the sub-scanning means moves the image read-out means back and forth in the sub-scanning direction relatively to the stimulable phosphor sheet, and the image read-out means detects stimulated emission emitted from a first stimulable phosphor sheet upon exposure to the stimulating light during the forward movement of the image read-out means to obtain a first image signal representing a first radiation image recorded on the stimulable phosphor sheet on the basis of the stimulated emission detected during the forward movement of the image read-out means relatively to the stimulable phosphor sheet, and detects stimulated emission emitted from a second stimulable phosphor sheet upon exposure to the stimulating light during the backward movement of the image read-out means to obtain a second image signal representing a second radiation image recorded on the second stimulable phosphor sheet on the basis of the stimulated emission detected during the backward movement of the image read-out means relatively to the stimulable phosphor sheet.

7. A radiation image read-out apparatus comprising an image read-out means provided with a stimulating light projecting means which projects stimulating light onto a stimulable phosphor sheet, bearing thereon a radiation image, along a main scanning line, and a photoelectric convertor means which detects stimulated emission emitted from the stimulable phosphor sheet upon exposure to the stimulating light, and a sub-scanning means which moves one of the stimulable phosphor sheet and the image read-out means in a sub-scanning direction intersecting the main scanning direction relatively to the other, the image read-out means causing the photoelectric convertor means to detect stimulated emission emitted from the stimulable phosphor sheet upon exposure to the stimulating light while one of the stimulable phosphor sheet and the image read-out means is moved in the sub-scanning direction relatively to the other and to photoelectrically convert the stimulated emission to an electric signal, thereby obtaining an electric image signal representing the radiation image on the stimulable phosphor sheet, wherein the improvement comprises that the sub-scanning means moves back and forth one of the stimulable phosphor sheet and the image read-out means in the sub-scanning direction relatively to the other, and the image read-out means detects stimulated emission emitted from the stimulable phosphor sheet upon exposure to the stimulating light during the forward movement of said one of the stimulable phosphor sheet and the image read-out means to obtain a first image signal representing the radiation image on the basis of the stimulated emission detected during the forward movement of said one of the stimulable phosphor sheet and the image read-out means, and detects stimulated emission emitted from the stimulable phosphor sheet upon exposure to the stimulating light during the backward movement of said one of the stimulable phosphor sheet and the image read-out means to obtain a second image signal representing the residual radiation image on the basis of the stimulated emission detected during the backward movement of said one of the stimulable phosphor sheet and the image read-out means, thereby obtaining information useful to determine the level of erasing light on the basis of the second image signal.

* * * * *